United States Patent
Crook

(10) Patent No.: US 8,540,792 B2
(45) Date of Patent: Sep. 24, 2013

(54) MULTI-PURPOSE FLEXIBLE COVER WITH MAGNETIC ATTACHMENT

(76) Inventor: Dale J. Crook, Overland Park, KS (US)

( * ) Notice: Subject to any disclaimer, the term of this patent is extended or adjusted under 35 U.S.C. 154(b) by 495 days.

(21) Appl. No.: 12/816,187

(22) Filed: Jun. 15, 2010

(65) Prior Publication Data

US 2010/0313535 A1    Dec. 16, 2010

Related U.S. Application Data

(60) Provisional application No. 61/187,215, filed on Jun. 15, 2009.

(51) Int. Cl.
*B01D 39/00* (2006.01)

(52) U.S. Cl.
USPC .............. 55/502; 55/480; 55/481; 55/500; 55/503; 55/512

(58) Field of Classification Search
USPC ............. 55/480–481, 490–512, DIG. 31, 55/DIG. 35; 156/297; 428/34.1; 454/187–193, 454/228–368
See application file for complete search history.

(56) References Cited

U.S. PATENT DOCUMENTS

| | | |
|---|---|---|
| 3,583,057 A | 6/1971 | Kolozsvary |
| 4,257,645 A | 3/1981 | Balogh |
| 5,458,667 A | 10/1995 | Poggi et al. |
| 5,758,922 A | 6/1998 | Wheatley |
| 6,003,929 A | 12/1999 | Birdsell |
| 6,099,612 A | 8/2000 | Bartos et al. |
| 6,174,340 B1 * | 1/2001 | Hodge .................. 55/385.1 |
| 6,241,794 B1 * | 6/2001 | Jadran et al. ............ 55/490 |
| 6,672,643 B1 | 1/2004 | Brodskiy et al. |
| 2008/0160904 A1 * | 7/2008 | Yi et al. ................ 454/309 |
| 2009/0133342 A1 | 5/2009 | Copeland |

OTHER PUBLICATIONS

"Insulated Whole House Magnetic Attic Fan Shutter Cover", http://www.magneticshuttercover.com, Retrieved from the internet Apr. 8, 2010, pp. 1-2.

* cited by examiner

*Primary Examiner* — Robert Clemente
*Assistant Examiner* — Karla Hawkins
(74) *Attorney, Agent, or Firm* — Law Office of Mark Brown, LLC; Mark Brown; Christopher M. DeBacker

(57) ABSTRACT

A flexible cover having magnetic attachment is provided for sealing openings in a structure such as a heating, ventilation and air conditioning duct, an automobile window, or an automobile door handle or lock. Magnets or another suitable affixing device are attached at the periphery on one side of the cover. Alternatively, the magnets may be attached to one side of the cover by sandwiching the magnets between two opposing flexible covers. Gaps between the magnets permit the flexible cover to attach to objects having a curved or angular conformation. In operation, the cover is placed over the opening preventing the transmission of air, fluid material, or particulate material through the opening.

7 Claims, 5 Drawing Sheets

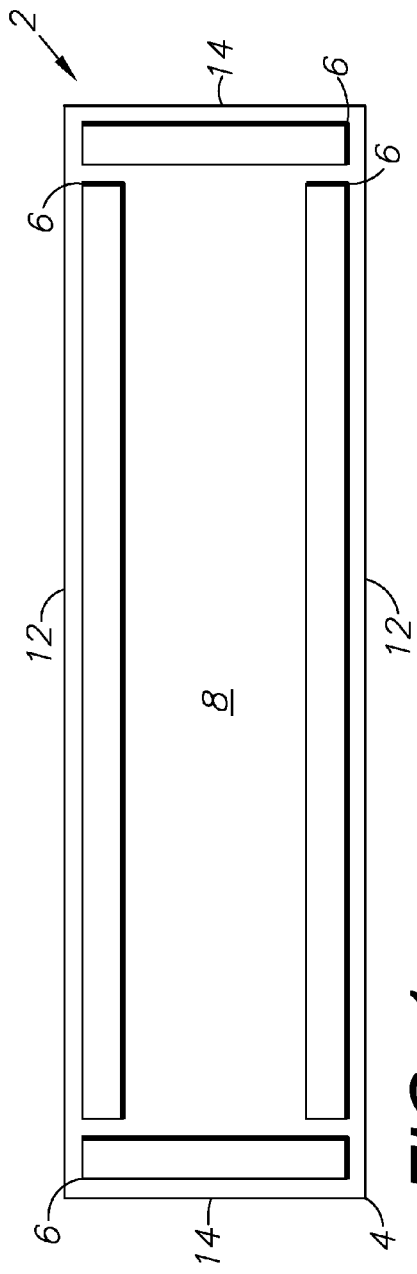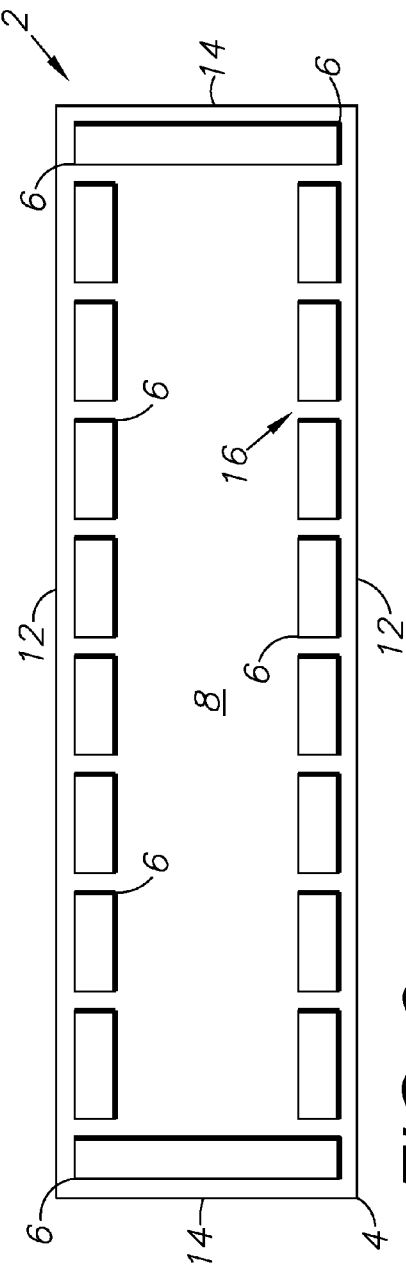

MULTI-PURPOSE FLEXIBLE COVER WITH MAGNETIC ATTACHMENT

CROSS-REFERENCE TO RELATED APPLICATIONS

This application claims priority in U.S. Provisional Patent Application No. 61/187,215, filed Jun. 15, 2009, which is incorporated herein by reference.

BACKGROUND OF THE INVENTION

1. Field of the Invention

The present invention relates generally to the sealing of spaces where air, pollutants, or other fluids may leak through, and more particularly to ventilation and duct work sealing around a filter slot or the covering or the sealing of the doors, door handles, lock key holes, and windows of a vehicle.

2. Description of the Related Art

The prevention of air, water, and other fluids from escaping from one space into another is a common problem in many fields. A wide array of cover types have been developed, from permanent to semi-permanent to temporary. Each has its own drawbacks and advantages; for example, a permanent cover may be permanently affixed to an opening through the use of glue, caulk, or some other sealant. Such a cover would be completely air-tight, provided the seal is correctly applied. However, removal of such a seal to see beneath the cover can be a long and difficult process. More temporary cover types offer ease of removal and replacement, but lack a perfectly air tight seal.

A specific area of air-leak prevention occurs in heating, ventilation and air conditioning (HVAC) duct work systems, particularly around the filter slot. The filter slot area is a particular problem because the filter must be readily accessible so that it may be replaced every few months. According to the American Society of Heating, Refrigerating and Air-Conditioning Engineers (ASHRAE), up to 30% of the air loss in a given residential HVAC system can occur at the furnace filter slot. Placing a permanent or semi-permanent seal over the furnace filter slot would likely cause more harm than good, as the furnace filter would then not be changed as frequently as necessary, resulting in damage to the entire system.

Further applications for fluid covers include the covering and sealing of vehicle windows. Upon the removal of a vehicle windshield or other window, it is important to prevent moisture, dust, dirt, and other particulates from entering the now-open vehicle while the glass is repaired or replaced. Additionally, if a vehicle's window has cracks, it is important to cover that window until it can be repaired in order to prevent fluid leaks. This is yet another application where the use of a permanent or semi-permanent seal is undesirable. A temporary cover that will not move when the wind blows is necessary to prevent damage to the interior of the vehicle. Currently, tarps and other large plastic sheets are used, but such devices leave large gaps between the cover and the vehicle where air may blow in dust and dirt particles, as well as moisture.

Additional further applications include covers for sealing door handles, locks, and keyholes of automobiles or other vehicles. During the winter, snow and ice can make it difficult to open a vehicle door and may even freeze the door shut or prevent the insertion of a key into a lock. Plastic sheets have been used in the past to some effect, but can be difficult to ensure that they remain affixed to the vehicle to prevent the formation of ice on the actual moving parts.

SUMMARY OF THE INVENTION

The main purpose of the present invention is to provide a temporary cover for a space for the prevention of fluid or particulate infiltration into or out of that space. The cover, though temporary, strives to provide an air-tight seal over the space in order to optimize the effectiveness of said cover. To facilitate this, the cover must attach itself to the object containing the space to be covered with a strong enough bond to prevent the leaking of air or other elements, while being easy to remove and replace.

The present invention employs specific attributes to obtain the best possible seal around a space to be covered, while maintaining its ability to be easily removed, moved, and replaced. A thin, flexible covering material is used so that even irregularly shaped spaces can be covered adequately. A mechanism for attaching the device to the area around the covered space is employed to facilitate a strong seal against fluid or particulate infiltration, while being easy to remove by human hand.

The present invention could be further used to prevent the accumulation of ice, snow, leaves, or other debris on a sensitive area. An outdoor condensing unit as part of an HVAC system may be covered during the off-season to prevent debris entering the device. Additionally, door handles or keyholes may be covered during cold seasons to prevent the accumulation of ice from building on the surface. Because the cover is easy to remove, but maintains a strong seal while in use, the accumulation of ice, snow, or debris would pile up on the exterior of the cover and would later be easily removed by human hands, revealing a perfectly protected space beneath.

The present invention has advantages over the prior art in several significant ways. First, the invention is very flexible and can cover a wide variety of spaces and objects. Second, the device maintains a tight seal preventing the infiltration of fluids or particulates while covering a wide array of space types. Finally, the device is easy to remove and easy to replace over the object to be covered at the whim of the user. The quality of the seal will not degrade over time.

BRIEF DESCRIPTION OF THE DRAWINGS

In the accompanying drawings, which illustrate the principles of the present invention and an exemplary embodiment thereof:

FIG. 1 is a plan view of the present invention in its intended form.

FIG. 2 is a plan view of the present invention in an alternative form.

DETAILED DESCRIPTION OF THE PREFERRED EMBODIMENTS

Figure 3:
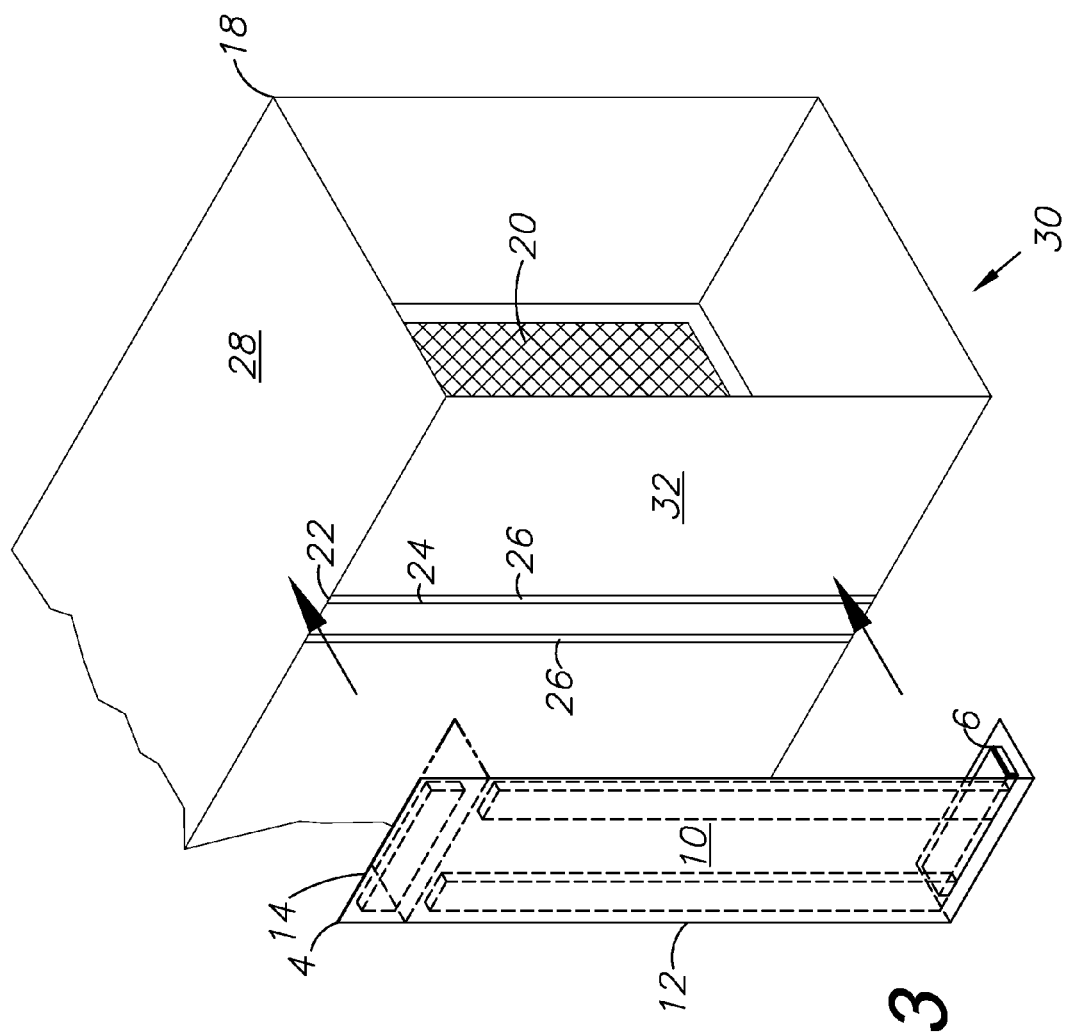
FIG. 3 is an exploded isometric view showing the interaction of the present invention with a piece of HVAC duct containing a furnace filter slot.

In the following description, reference is made to "up" and "down," but this is merely for convenience and clarity. It is to be understood that the present invention is not to be limited in orientation, size, shape, or layout.

Referring to the drawings in more detail, the reference numeral 2 generally designates a flexible cover device. The device 2 is comprised of a flexible sheet 4 of plastic, rubber, or some other material. The flexible sheet includes an inner face 8 and an outer face 10, two sides 12 and two ends 14. Attached to the inner face 8 of the flexible sheet 4 is an array of magnets 6. The magnets are placed a distance away from the sides 12 and ends 14, creating an overlap of the sheet 4. The magnets 6 attach the cover 2 to a piece of metal, such as a run of ductwork or an automobile exterior.

The magnets 6 may be comprised of a strip of magnetic material with adhesive backing. The adhesive is initially covered, but this cover can be peeled off revealing the adhesive, and the magnet 6 can be placed onto the flexible sheet 4, using the adhesive and securing the two pieces together. Alternatively, the magnets 6 may be glued onto the flexible sheet 4, or attached in any other similar fashion. The magnets 6 may also be placed between two flexible sheets 4 which will then be heated, creating a seal around the magnets and holding them in place. Additionally, the magnets 6 may be placed between two flexible sheets 4 which are then sewn together in a manner to prevent the magnets from sliding.

The focus of the present invention is to cover an air space. The flexible sheet 4 allows the device 2 to be of any shape or size. The sheet can wrap around and cover any space or item desired. The device is attached to the item being covered by the magnets 6. The magnets will attach the flexible sheet 4 over a desired space and provide a seal preventing particulates or liquids from infiltrating the cover 2. In a preferred embodiment, the flexible sheet would be made of an appropriate material which would allow the user to write the date the furnace filter was replaced on the outside surface of the strip. This allows the user to ensure that the furnace filter is changed at appropriate times to remove contaminants from the air.

Figure 4:
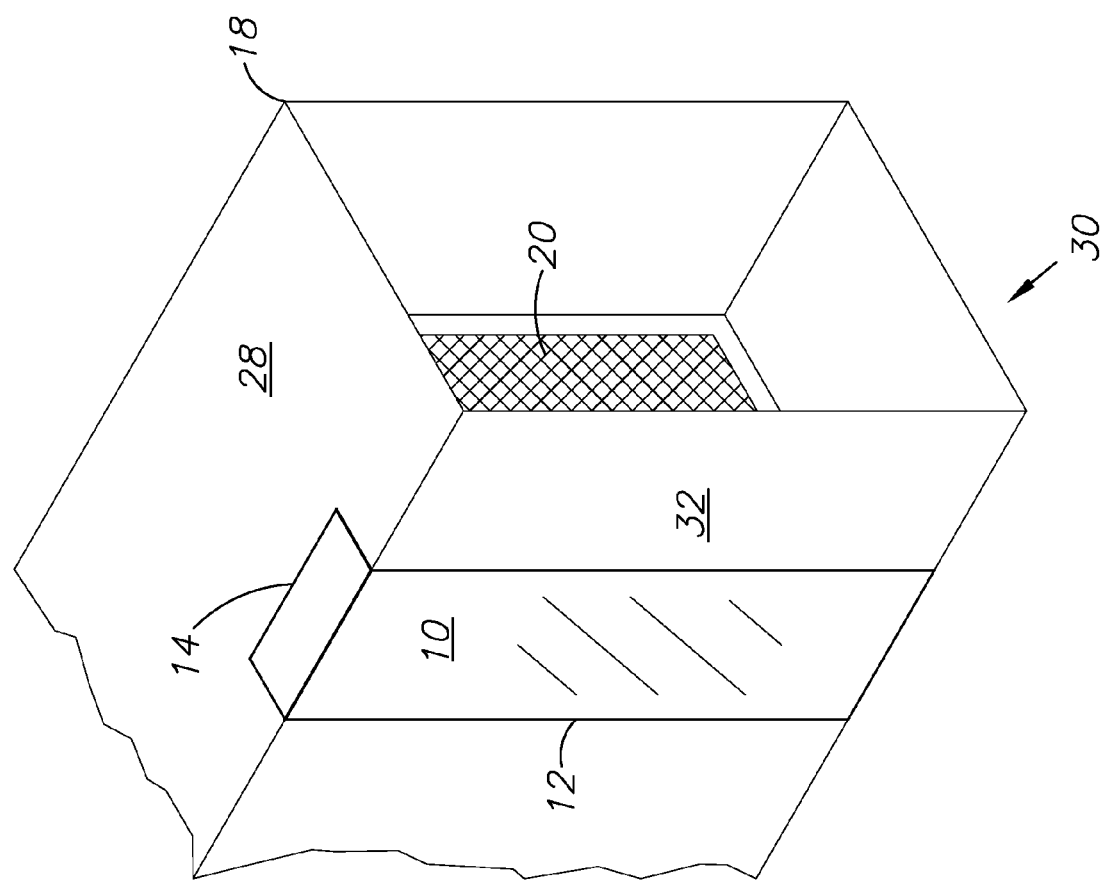
FIG. 4 is an isometric view demonstrating the coverage and sealing capabilities of the present invention.

FIG. 1 shows a preferred embodiment of the flexible cover 2. The cover contains four magnets 6 and can be used to cover a filter slot or other linear opening. FIGS. 3 and 4 demonstrate how the cover 2 fits over a filter slot within a segment of ductwork. Once the cover 2 is in place, the magnets 6 hold the flexible sheet 4 over the filter slot and prevent air from leaking out of the run of the duct work.

FIGS. 3 and 4 demonstrate how the cover 2 will seal a filter slot 22 located within a piece of duct 18. The filter slot 22 is designed to accept a filter 20. The filter is a necessary component to the HVAC system and must be replaced every few months. Typically, the filter edge 24 is exposed within the filter slot 22. Air gaps 26 are located on either side of the filter edge 24. This can account for a large portion of air loss in the HVAC system. The cover 2 is placed over the filter slot 22, and each end 14 is folded over the top and bottom of the duct 18. The magnets 6 located near the ends 14 of the cover will attach to the upper and lower faces 28, 30 of the duct 18. The magnets 6 located along the sides 12 of the cover 2 will attach to the front face 32 of the duct 18 wherein the filter slot 22 is located. The magnets 6 will form a seal against the duct 18, and the flexible sheet 4 will prevent air from escaping or entering the filter slot 22 through the air gaps 26.

FIG. 4 shows the flexible sheet 4 engaging the duct 18 and fully covering the filter slot 22. The magnets 6 engage with the face of the duct 32, ensuring an air-tight seal. The air-tight seal prevents outside air from being drawn into the filter slot 18, enhancing the efficiency of the HVAC system. The air-tight seal also prevents pollutants, dust, or other contaminants from entering the duct system, ensuring higher air quality and extending the life of the filter 20.

FIG. 2 shows an alternative embodiment of the cover 2. This particular embodiment includes a flexible sheet 4 with an inner face 8 and an outer face 10, as well as a series of magnets 6. Between the magnets are flex spaces 16, which allow the cover 2 to be more flexible and attach itself to uniquely shaped items, such as a curved windshield or round duct pipe, to provide a tight cover and seal.

Figure 5:
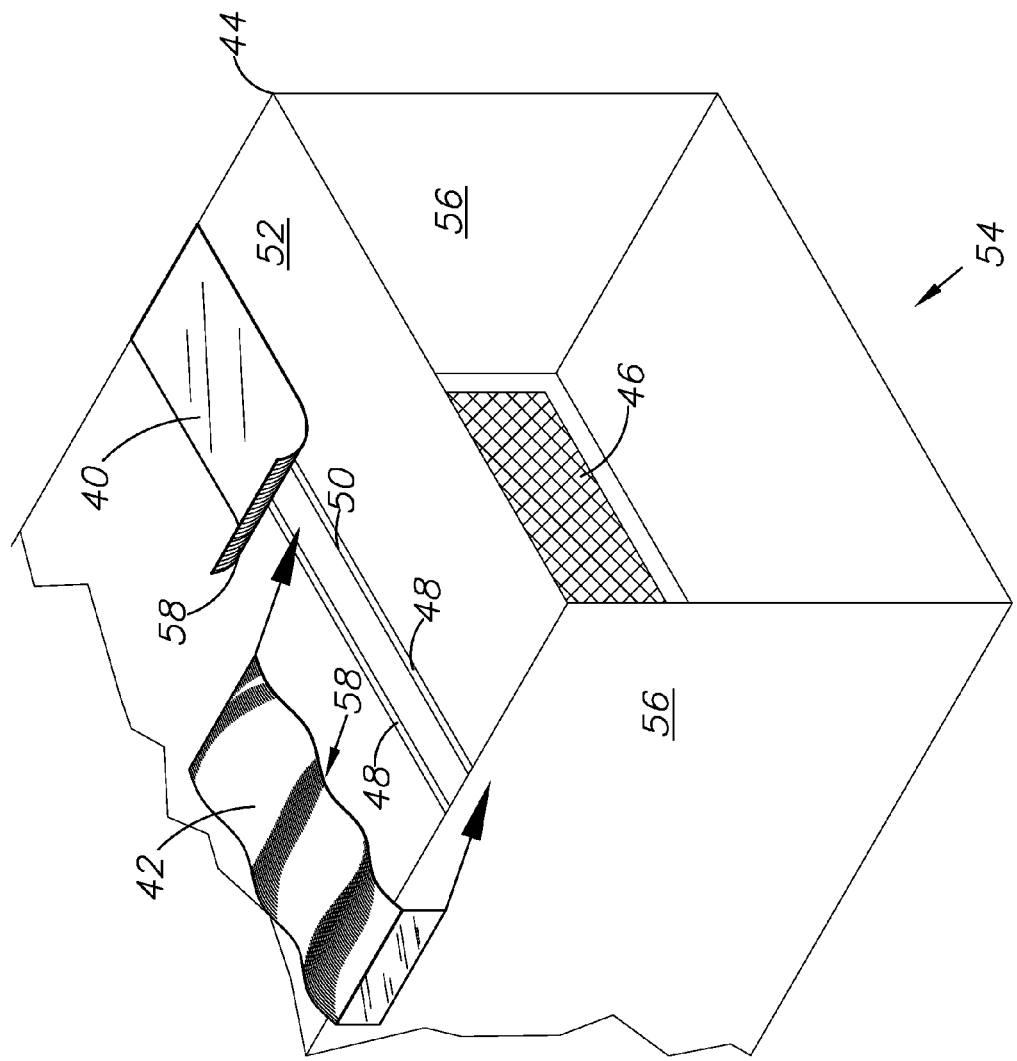
FIG. 5 is an isometric view demonstrating an alternative embodiment of the present invention with a piece of HVAC duct containing a furnace filter slot.
Figure 6:
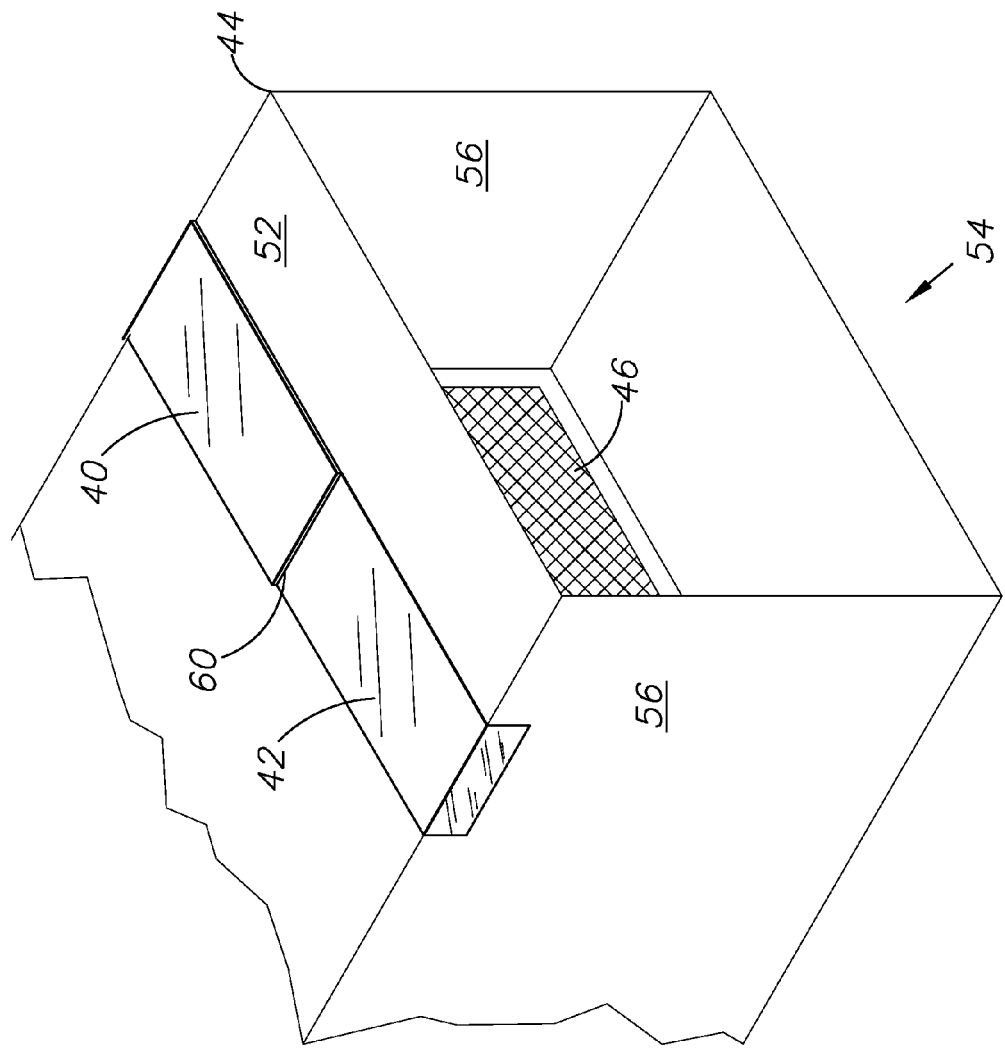
FIG. 6 is an isometric view demonstrating an alternative embodiment of the present invention with a piece of HVAC duct containing a furnace filter slot.

FIGS. 5 and 6 demonstrate an additional alternative embodiment of the cover comprised of multiple flexible strips. FIG. 5 demonstrates a cover where a top cover strip 40 and a bottom cover strip 42 are employed to prevent air, smoke, or other undesirables from entering the duct system through the filter slot 48. FIG. 5 shows a piece of duct 44 with a filter slot 48 located on the top duct face 52 containing a filter 46. The filter edge 50 does not completely fill the filter slot 48, allowing air to inter the duct return through said filter slot. The filter slot 48 alternatively could be found in the side duct face 56 or the bottom duct face 54.

The top cover strip 40 and bottom cover strip 42 contain an adhesive face 58. The adhesive face is comprised of any reusable device capable of connecting the cover strips 40, 42 to the duct 44 in a non-permanent manner. Such adhesive devices include, but are not limited to, magnets, reusable tacky adhesive, or double-sided tape. FIG. 4 demonstrates the top cover strip 40 being placed onto the duct 44 first, an edge pulled back to allow the bottom cover strip 42 to be placed on the duct 44 and underneath of the top cover strip 40.

FIG. 5 demonstrates the top cover strip 40 overlapping the bottom cover strip 42 at an overlap point 60. When the cover strips are fully engaged with the duct 44, an air-tight seal is created which prevents outside air, smoke, or other undesirable elements from entering the return duct. The cover strips 40, 42 cover the filter slot 48 and filter edge 50 along the top duct face 52 and run down onto the side duct face 56 to provide a complete seal. Additional cover strip s may be added for larger filter slots 48.

The cover strips 40, 42 may engage with the ductwork using a series of magnets, or by any other means for sufficiently connecting the strips to the duct in a temporary manner, while providing an air-tight seal for the duration of the engagement. It is preferable that the strips be reusable, thus the preferred embodiment includes magnets along the edge of the cover strips. The magnets may either be affixed to one side of the strip, as shown previously in FIG. 2, or they may be inserted between two thin sheets comprising the strip.

FIG. 6 shows the cover strips 40, 42 fully engaged with the duct 44. A seal is formed along the top face 52 and side faces 56. A seal is also fully formed along the overlap point 60. Dust, outside air, and other contaminants are prevented from entering the return air pathway, thus increasing air quality and system efficiency.

It is to be understood that the invention can be embodied in various forms, and is not to be limited to the examples discussed above. For example, the flexible sheet 4 may be of any shape or size, and the magnets 6 can be placed in any desired array in order to best fit over an item to be covered and to seal that item away from particulates or fluids. The flexible sheet 4 may include additional sealing mechanisms, such as reusable adhesive or a hook-and-loop interface. The sheet can be used to cover an automobile window or door handle or lock mechanism and prevent rain, snow, or ice from interfering with the vehicle.

Having thus described the disclosed subject matter, what is claimed as new and desired to be secured by Letters Patent is:

1. A magnetic sealing cover for a furnace filter slot in a ferro-magnetic return duct of a heating, ventilation, and air conditioning (HVAC) system, said return duct having a generally rectangular configuration with opposite faces and opposite sides, one of said return duct faces including said furnace filter slot, which sealing cover comprises:

inner and outer sheets of flexible, impermeable material;

said sheets being sealed together along their respective side edges and ends, forming a sheet assembly with first and second side edges and first and second opposite ends;

first and second side sets of magnet segments, each side set being sealed between said sheets adjacent to a respective first and second side edge;

each said set of magnets comprising multiple, individual, magnet segments longitudinally aligned and extending between said sheet ends in proximity to a respective sheet side edge;

first and second end magnet segments sealed between said sheets in proximity to said first and second sheet assembly ends respectively;

first and second transverse fold lines each extending between said first and second side edges in proximity to a respective sheet assembly end; and said sheet assembly having an installed, sealing position with said sheet assembly overlying said furnace filter slot and said first and second side sets of magnets releasably, magnetically attached to said return duct face, said sheet assembly ends being folded over respective return duct side faces along respective fold lines, and said duct assembly ends being releasably, magnetically attached to said return duct side faces by said end magnet sets.

2. The magnetic sealing cover of claim 1, wherein the return duct section is comprised of galvanized steel or other suitable material.

3. The magnetic sealing cover of claim 1, wherein said magnet is attached to said flexible sheet inner face by a permanent adhesive.

4. The magnetic sealing cover of claim 2, further comprising:

a second magnetic sealing cover having the same dimensions as said first magnetic sealing cover;

a plurality of magnets affixed to said second magnetic sealing cover; and said second magnetic sealing cover overlaps the first magnetic sealing cover, providing an airtight seal to said duct filter slot.

5. A method of sealing over a furnace filter slot in a ferromagnetic return duct of a heating, ventilation, and air conditioning (HVAC) system, said return duct having a generally rectangular configuration with opposite faces and opposite sides, one of said return duct faces including said furnace filter slot, which sealing method comprises:

providing inner and outer sheets of flexible, impermeable material;

sealing said sheets together along their respective side edges and ends, forming a sheet assembly with first and second side edges and first and second opposite ends;

providing first and second side sets of magnet segments and sealing each said magnet side set between said sheets adjacent to a respective first and second side edge;

providing each said set of magnets with multiple, individual, magnet segments longitudinally aligned and extending between said sheet ends in proximity to a respective sheet side edge;

providing first and second end magnet segments;

sealing said first and second end magnet segments between said sheets in proximity to said first and second sheet assembly ends respectively;

providing first and second transverse fold lines each extending between said first and second side edges in proximity to a respective sheet assembly end;

installing said sheet assembly in an installed, sealing position overlying said furnace filter slot;

magnetically, releasably attaching said first and second side sets of magnets to said return duct face;

folding said sheet assembly ends over respective return duct side faces along respective fold lines; and releasably, magnetically attaching said duct assembly ends to said return duct side faces by said end magnet sets.

6. The method according to claim 5, wherein said furnace filter slot further includes an air filter inserted into said filter slot.

7. The method according to claim 5, including the steps:

providing a second magnetic sealing cover; and aligning the second magnetic sealing cover over the furnace filter slot, partially overlapping the first magnetic sealing cover.

\* \* \* \* \*